March 21, 1967 C. IVANOFF ETAL 3,310,029
TUBE COATING APPARATUS
Filed Dec. 5, 1962
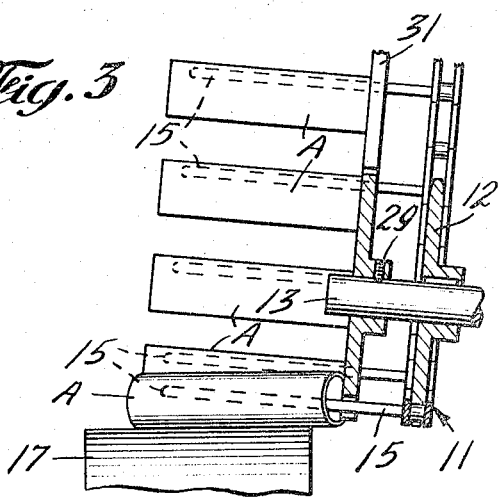
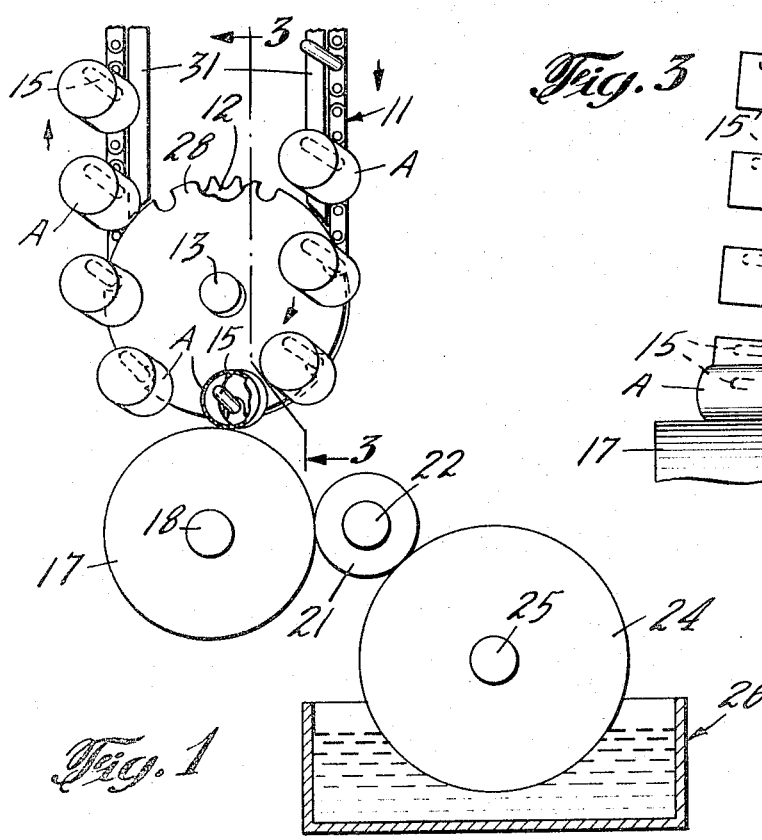
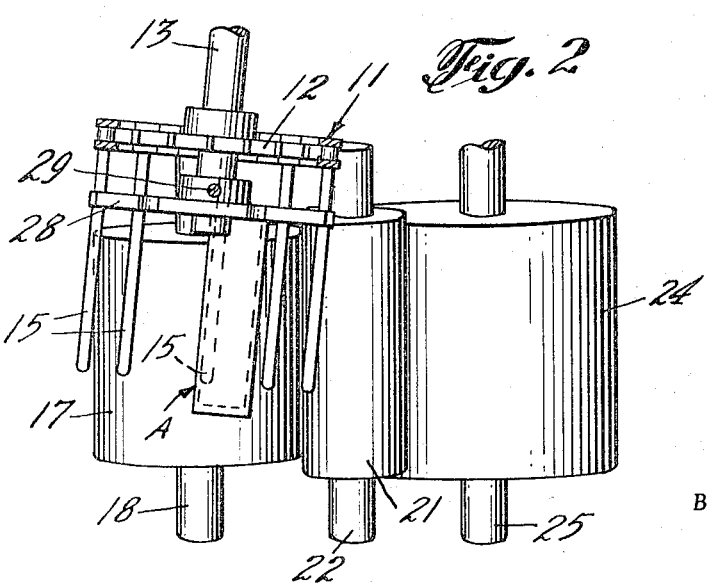
INVENTORS
CHARLES IVANOFF
EIBERT JANSEN
BY Leland R. McCann
George W. Reiber
ATTORNEYS

United States Patent Office 3,310,029
Patented Mar. 21, 1967

3,310,029
TUBE COATING APPARATUS
Charles Ivanoff and Eibert Jansen, Ottawa, Ontario, Canada, assignors to American Can Company, New York, N.Y., a corporation of New Jersey
Filed Dec. 5, 1962, Ser. No. 242,438
4 Claims. (Cl. 118—230)

The present invention relates to apparatus for externally coating rigid or semi-rigid tubular containers or container bodies and has particular reference to devices for effecting the coating operation while the containers or bodies are carried on a continuously moving conveyor which is utilized to carry the coated containers or bodies through a drying oven without transfer of the containers or bodies to a separate conveyor.

An object of the invention is the provision of an apparatus for coating tubular containers or container bodies while suspended on pins of a moving conveyor in such a manner that the containers or bodies will be free and unsupported by the conveyor pins during the coating operation so that they will be free to rotate on a conventional driven coating roller and thereby pick up a desired film or covering of a coating material on the roller.

Another object is the provision of such an apparatus for coating tubular containers or bodies carried on conveyor pins wherein containers or bodies of various diameters may be coated while carried by the same conveyor.

Another object is the provision of such an apparatus for coating tubular containers or bodies wherein the containers or bodies are presented to the coating devices in such a manner as to insure against their displacement from the conveyor during the coating operation.

Another object is to provide for coating a predetermined length of the containers or bodies so as to leave an end portion uncoated for a subsequent use and to further provide for controlling the length of the uncoated portion.

Another object is to provide for the complete operations of coating and drying and recoating and redrying operations if necessary while the containers or bodies are carried on a single conveyor so as to eliminate handling of the containers or bodies from one conveyor to another for the performance of the separate coating and drying, or other operations.

Numerous other objects and advantages of the invention will be apparent as it is better understood from the following description, which, taken in connection with the accompanying drawings, discloses a preferred embodiment thereof.

The accomplishment of these objects is effected by the provision on a continuously moving conveyor, of projecting slender pins over which open end containers or bodies may be slipped and supported or carried in suspension, the containers or bodies being carried into tangential engagement with the outer coated surface of a conventional driven coating roller. The path of travel of the conveyor pins is such that during the tangential engagement of the containers or bodies with the coating roller, the pins are located at a level within the containers or bodies that completely free and leave the containers or bodies unsupported by the pins to insure frictional rotation of the containers or bodies by the roller and thereby cause the containers or bodies to pick up a film of coating material from the roller. For this coating operation the containers or bodies are presented to the roller at an angle to the axis of the roller so that the roller rotates the containers or bodies in a direction which urges the containers or bodies toward the conveyor and thereby prevents their displacement during their free unsupported rotation for the coating operation. An adjustable stop adjacent the conveyor controls the longitudinal position of the containers or bodies and provides for the spacing of their uncoated end from the edge of the coating roller.

Referring to the drawings:

FIGURE 1 is a side elevation of one form of apparatus embodying the instant invention and for carrying out the method steps of the instant invention, parts being broken away and parts shown in section;

FIGURE 2 is a top plan view of the apparatus shown in FIG. 1; and

FIGURE 3 is a sectional view taken substantially along the line 3—3 in FIG. 1.

As a preferred and exemplary embodiment of the instant invention the drawings disclose method steps and one form of apparatus for exteriorly coating a rigid or semi-rigid tubular, cylindrical container A (FIGS. 1, 2 and 3) having one end closed and the other end open.

The invention contemplates the effectuation of the coating operation as an incident to subsequent operations such as drying or baking, and recoating and redrying if necessary while the containers A remain in place on a continuously moving conveyor which advances along a path of travel extending through suitable stations or devices where these operations may be performed. For this purpose the containers A are carried in spaced relation on a conveyor 11 (FIGS. 1, 2 and 3).

The conveyor 11 preferably is an endless chain operating over suitable driven and idler sprockets, one of which designated by the numeral 12, is disposed at the coating station and is mounted on a rotatable shaft 13.

At spaced intervals along its length the conveyor 11 is provided with slender prongs or pins 15 which project at right angles from the chain, with their outer ends free and unsupported so that a container A may be readily slipped over the end of a pin and thereby be carried, in a suspended fashion, by the conveyor. The conveyor 11 preferably is disposed at a slight angle of between 6 to 8 degrees to the vertical as best shown in FIG. 3 to retain the containers in place on the pins.

At the coating station a conventional geletin type application roll 17 is mounted on a shaft 18 for rotation. This application roll carries a film of coating material to be applied to the external surface of the container suspended on a pin 15. The roll 17 receives this coating material from a steel transfer or metering roll 21 mounted on a shaft 22 and disposed in tangential engagement with the application roll. The metering roll 21 is also in tangential engagement with and receives coating material from a pick-up roll 24 mounted on a rotating shaft 25 and operating in a reservoir 26 containing a supply of the coating material.

The conveyor 11 disposed adjacent the application roll 17 is located so that the path of travel of the pins 15, as they advance under the sprocket 12, is above the top of the outer surface of the application roll 17 and is disposed in spaced relation thereto a distance greater than the thickness of the side wall of the container but less than the inside diameter of the container. The conveyor 11 is also located at a slight angle of between 3 and 6 degrees to the horizontal, as best shown in FIG. 2 so that the pins 15 passing over the application roll 17 are in an angular position in relation to the axis of the application roll.

Hence when a container A carried on a pin 15 of the conveyor approaches the application roll 17 it tangentially engages the roll and is supported and rotated thereby, and thus rides upwardly sufficiently to be free and unsupported by the pin 15. The pin 15 merely guides the container and drags it across the face of the application roll in a free and unsupported manner, thereby allowing the container to roll on the face of the rotating application roll 17 and pick up a film of the coating material on the roll.

The application roll 17 is rotated in a direction opposite to the travel of the conveyor 11 and the pin 15 on the conveyor is inclined in a direction corresponding to the direction of travel of the conveyor. Hence the pin in dragging the container across the face of the application roll guides the container in a corresponding angular relation with the result that the rotation of the application roll acts to urge the container toward the conveyor and thereby prevent its displacement from the pin during the coating operation while at the same time insuring a precise location of the container relative to the conveyor.

In some cases it is desirable to leave a portion of the open end of the container uncoated so as to receive a cover or the like. For this purpose a locating plate 28 is provided adjacent the path of travel of the containers advancing around the conveyor sprocket 12. This plate serves as a stop against which the open ends of the containers engage and thus determines the space between the stop and the edge of the application roll to permit a portion of the container endwise to overhang the roll which in turn determines the portion of the container to be left uncoated.

The locating plate 28 preferably is adjustably mounted on the conveyor shaft 13 and is formed with a serrated edge to permit the pins 15 to extend beyond the plate. A set screw 29 in the hub of the plate provides for adjustability of the plate along the sprocket shaft 13. Guide rails 31 are also provided to slide the containers along their pins 15 into flush alignment with the face of the plate 28 as they approach the plate.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

We claim:

1. An apparatus for exteriorly coating rigid and semi-rigid containers having at least one end open, comprising a rotatable application roll, means for supplying coating material to the outer face of said roll, a conveyor movable along a path of travel adjacent to and in spaced relation to said roll, and a pin projecting from said conveyor and having a free end over which a container can be slipped for conveying the container suspended thereon into engagement with the outer face of said roll, said pin being of materially less diameter than the diameter of said container and being located to pass over said roll in spaced relation thereto at least a distance greater than the thickness of the side wall of said container to freely and unsupportedly drag said container across the coated face of said roll for free frictional rotation thereon to affix a film of said coating material to said container, said pin also being disposed at an angle horizontally to the axis of said roll in a direction opposite to the rotation of said roll to urge said container toward said conveyor to insure against displacement of the container from said pin during the coating operation.

2. An apparatus of the character defined in claim 1 wherein there is provided a stop plate disposed adjacent the path of travel of a container across the face of said roll, said plate being locatable in a predetermined spaced relation to the edge of said roll to precisely locate said container in an endwise relation to provide for a predeterminated overhang of a portion of said container to be left uncoated.

3. An apparatus of the character defined in claim 2 wherein said stop plate is a rotatable member mounted to revolve through said path of travel in registry with said pin.

4. An apparatus for exteriorly coating tubular articles, comprising an endless conveyor movable over a sprocket through an arcuate path of travel, a plurality of article-supporting pins projecting laterally of said conveyor at equally spaced increments, and a coating mechanism including a rotatable roll disposed adjacent said sprocket with its coating surface laterally aligned with and spaced from said pins moving through said arcuate path a distance less than the inside diameter of the articles being coated but greater than the wall thickness thereof, said pins being disposed at an angle horizontally to the axis of said roll in a direction opposite to its rotation during their movement through said arcuate path to carry said articles thereon into free, unsupported rolling engagement with the surface of said roll and at a slight angle of contact therewith to urge said articles onto said pins and thereby insure against displacement during the coating operation.

References Cited by the Examiner

UNITED STATES PATENTS

| 1,707,088 | 3/1929 | Lynch. | |
| 2,015,669 | 10/1935 | Gravely et al. | 118—233 X |
| 2,651,607 | 9/1935 | Harris | 198—131 X |
| 2,800,872 | 7/1957 | Remington et al. | 118—500 X |
| 3,099,580 | 7/1963 | Dyar | 118—233 |

FOREIGN PATENTS

| 179,402 | 5/1922 | Great Britain. |

CHARLES A. WILLMUTH, *Primary Examiner.*

RICHARD D. NEVIUS, *Examiner.*

J. A. HAUG, *Assistant Examiner.*